June 26, 1956 K. SCHULTZ ET AL 2,752,286
EXTRACTION OF INSULIN FROM PANCREAS TISSUE
Filed Sept. 11, 1952
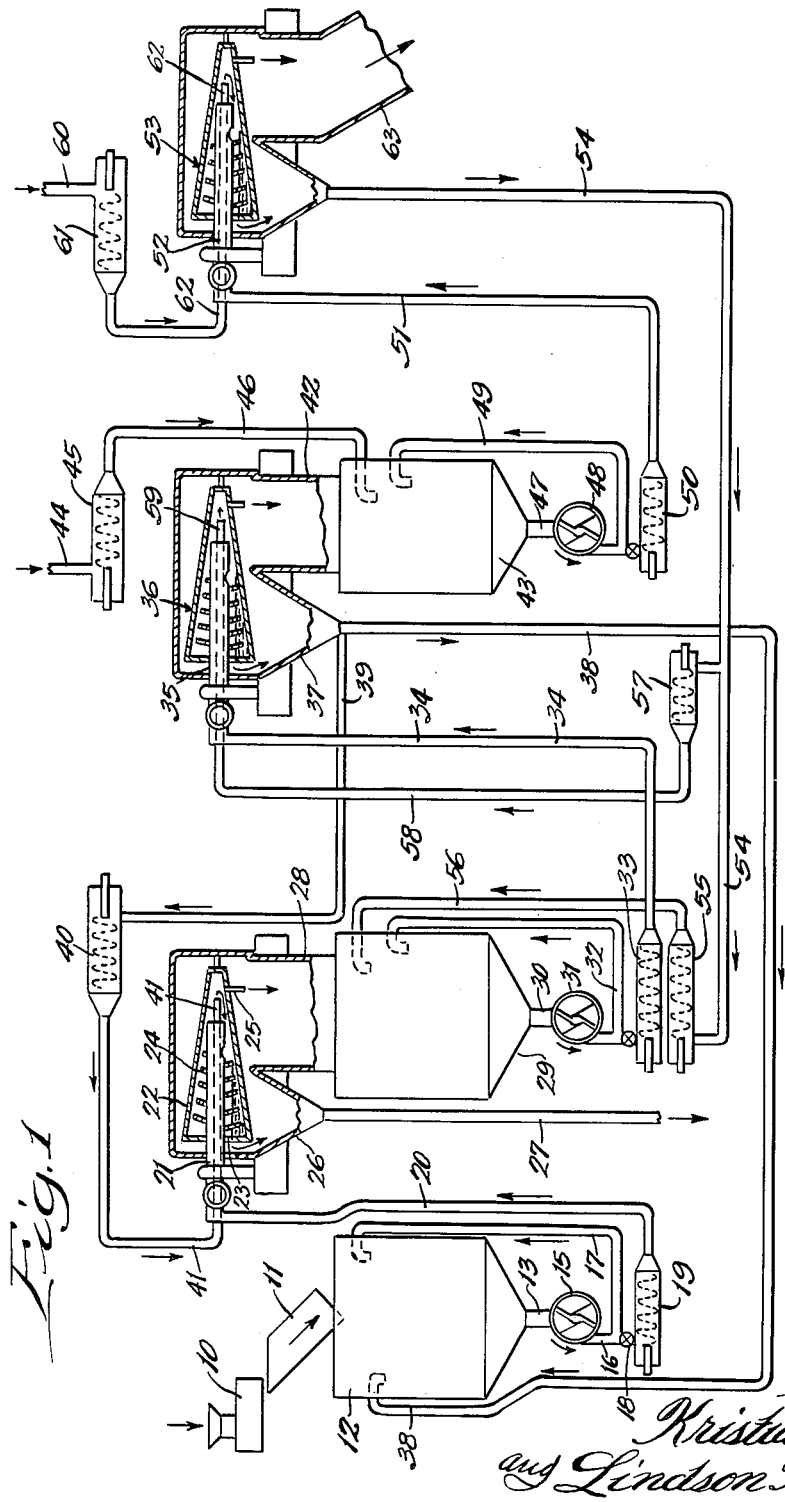
Inventors:
Kristian Schultz
and Lindson P. Anderson,
By Carl C. Batz
Attorney.

United States Patent Office 2,752,286
Patented June 26, 1956

2,752,286

EXTRACTION OF INSULIN FROM PANCREAS TISSUE

Kristian Schultz and Lindson P. Anderson, Chicago, Ill., assignors to Armour and Company, Chicago, Ill., a corporation of Illinois Application September 11, 1952, Serial No. 309,017

2 Claims. (Cl. 167—75)

This invention relates to the extraction of animal tissues for the recovery of important material therein. More specifically, the invention relates to the recovery of insulin from animal pancreas glands and involves novel process steps and apparatus through which insulin is effectively recovered from pancreas glands. The invention also comprehends steps and means for recovering fat or lipoidal material from animal tisues, etc.

The present application constitutes a continuation-in-part of our co-pending application, Serial No. 18,814, filed April 3, 1948, now abandoned.

An object of the invention is to provide a method and means for the treatment of animal tissues in liquid for the extraction of important materials contained in the tissues. A further object is to provide a method and means by which animal pancreas glands are effectively extracted in a solvent for insulin. Another object is to provide a process and apparatus in which pancreas gland material is treated to shear or distort individual masses or particles of insulin bearing solids, in the presence of a solvent, and during the extraction step. A further object is to provide a process and apparatus in which pancreas gland material is comminuted in the presence of an insulin solvent, while withdrawing portions of the material for the separation of solids and liquid extract. A still further object is to provide for the recycling of solvent and pancreas material to and from an extraction zone while further comminuting the material. Yet another object is to provide in such a process means for separating solids from liquid extract and returning liquid extract to the extraction zone. Still another object is to extract pancreas material with a solvent for insulin, while withdrawing a portion of the material and passing the same through a plurality of solids separating devices in sequence, the liquid extract being recycled for use in prior separation steps. Another object is to provide a process and means for the extracting of animal pancreas glands with an insulin solvent, while recycling and comminuting pancreas material, withdrawing a portion of the material, separating solids from liquid in a plurality of separation devices arranged in sequence, introducing a fresh solvent into the last of the separating devices for reusing such solvent, together with liquid extract from the separation devices, in earlier separation steps. A still further object is to provide a method and means for the treatment of animal tissues for the recovery or separation of lipoidal material. Other specific objects and advantages will appear as the specification proceeds.

The process forming our invention may be practiced in apparatus as set out in the accompanying drawing, in which—

Figure 1 is a diagrammatic view of apparatus embodying our invention and in which the process of our invention may be employed, some of the apparatus being shown in vertical section; and Fig. 2, a perspective view of the component parts employed in the comminuting pump shown in Fig. 1.

In one embodiment of the process, the animal pancreas glands are introduced into a grinder 10 and passed therefrom through a chute 11 into the tank 12, which contains the extracting solvent. The base portion of the tank 12 is provided with downwardly- and inwardly-inclined side walls leading to an outlet pipe 13. The pipe 13 communicates with the inlet 14 of a comminuting impeller pump 15, and the material is discharged from the pump through the outlet 16. A return pipe 17 communicates with the outlet 16 and leads upwardly to the top portion of the tank 12.

Also communicating with the outlet pipe 16 of pump 15 is a conduit 18 leading to a metering pump 19. The metering pump 19 sends the material through a pipe 20 to the intake pipe 21 of a separator cylinder 22 which is provided with an overflow outlet 23. The intake pipe or shaft 21 is rotatably driven and is equipped with the screw members 24, which tend to elevate the solids toward a discharge chute 25. Liquids fall into the chute 26 and are recovered in pipe 27, while solids are discharged through the outlet 28 into a second extraction tank 29.

The second extraction tank 29 is also equipped with a draw-off pipe 30 and a pump 31 like the impeller pump 15, and with a recirculating pipe 32. There is also provided a valved pipe communicating with the outlet from pump 31 and leading into a metering pump 33. The metering pump 33 passes the mixture of solvent and solids through pipe 34 to the inlet 35 of the second separator 36, which is similar to the separator 22. Liquid discharged from separator 36 passes downwardly through the chute 37 into a return pipe 38 leading back to the extraction tank 12. There is also provided a pipe 39 leading from the outlet 37 to a metering pump 40, which passes the liquid extract into a pipe 41 extending through the inlet pipe 21.

The solids from the second separator 36 pass into the outlet 42 and into the third extracting tank 43. Fresh solvent may be introduced through pipe 44 and metering pump 45, through pipe 46, into the upper portion of tank 43. The tank 43 is provided with a draw-off pipe 47, impeller pump 48, similar to pump 15, and with a recycling pipe 49. A metering pump 50 has an inlet communicating with the outlet of pump 48 and delivers material through pipe 51 to the inlet pipe 52 of a third separator 53. Liquid extract from the separator 53 is returned through pipe 54, and a portion is forced by the metering pump 55 through pipe 56 into the top of the second extracting tank 29. Another portion is withdrawn from pipe 54 through the metering pump 57, and thence through pipe 58 into pipe 59, which extends through the rotating inlet pipe 35 of the second separator 36.

Fresh solvent is introduced through the pipe 60 and passed by the metering pump 61 into the pipe 62, which extends through the rotating inlet pipe 52 of the third separator 53. The exhausted cake from separator 53 is withdrawn through outlet pipe 63 and sent to a discharge system for solvent recovery and/or drying.

The separators 22, 36 and 53, shown schematically in the drawing, are continuous Bird-type centrifuges, and we prefer to use centrifuges of this general type, but alternately we may use the Sharples Superdecanter-type centrifuge, a continuous pressure or vacuum-type filter, an Enterprise expeller-type fruit separator, or other suitable separating device.

In the specific illustration given and as shown particularly in Fig. 2, a pump 15 is equipped with a heavy bladed impeller 64 mounted upon the motor shaft and maintained within the closed casing by the closure member 65. This impeller 64 is driven at a peripheral speed of 1500 or more feet per minute and a rotational velocity of 450 or more revolutions per minute. Such impeller is found to be highly efficient in producing the chopping and diffusing effects necessary for enhancing the extracting function. Note in Fig. 2 how in the operation of the pump the impeller blade 64 will, by reason of its relation to the casing and outlet port 66, exert a shearing or squeezing action on any solid material which is disposed between the blade and the casing, particularly at the edge of the outlet port. At the same time, pump 15 forces the comminuted material through the return pipe to the top of the extracting tank.

As a specific example of operation using the apparatus illustrated, half-frozen pancreas glands are comminuted in the grinder 10 and passed into the tank 12, where they meet an extract consisting of phosphoric acid and ethyl alcohol and insulin recovered from the second separator through pipe 38. The slurry of glands and solvent in the tank 12 is recirculated by the pump 15. A portion of the withdrawn slurry is passed by the metering pump 19 to the separator 22. The effluent from separator 22, which is the effluent which contains insulin in greatest proportion, may be withdrawn through pipe 27 for further processing by well-known methods to prepare the final insulin product.

The discharge cake from separator 22 is washed with the semi-saturated effluent from separator 36 and through the lines 39 and 41. The discharge cake from separator 22 is mixed continuously in tank 29 with effluent from separator 53 through lines 54 and 56. The slurry is recirculated through pipe 32, while at the same time a portion of the material is metered to separator 36 through pipe 34.

Weakly-saturated effluent from separator 53 is returned through pipes 54, 58 and 59 to the second separator 36. Moderately-saturated effluent from separator 36 is metered to the first tank 12, to be used as an extracting agent in making up the primary feed for separator 22.

The cake discharge from separator 36 is mixed continuously with new solvent admitted through line 46 to tank 43 and is recirculated continuously through pipe 49. At the same time, a portion of the slurry is passed through pipe 51 to the third separator 53. The exhausted cake is removed through the outlet 63 to a discharge system for drying or for solvent recovery, or both.

It is an advantage of our improved process that it may be effectively operated using only one-half to two-thirds of the volume of solvent normally used in prior commercial processes. In the specific illustration given, the pancreas solids are exposed six times to graded saturated solvent. This is done in such a fashion as to expose the solids most nearly exhausted to the new solvent, and as the solvent becomes more nearly saturated, it is successively exposed to the pancreas solids of increasing insulin content until the solvent, leaving the system for processing, contains a maximum proportion of insulin.

The process described may be operated batchwise, as a semi-continuous process, or as a completely-continuous process. For example, with respect to tank 12, the recirculating pump 15 may be operated for recirculating all of the material passing through the pump back to the top of tank 12 for a period of time. Then the valve in line 18 may be opened to permit a measured proportion of the material to be passed through pipe 20 to the first separator 22. Similarly, in the other tanks 29 and 43, recirculation of the withdrawn material may be carried on for a period of time before cutting in the metering pumps for passing a proportion of the material to the remaining separators.

Although the specific apparatus illustrated includes three separating devices, it is possible to operate our process to good advantage using only two, or even one, such device. For example, the pancreas material may first be treated in an extraction vessel such as tank 12, using pump 15 and the recirculating system for about 30 minutes, more or less, as required to obtain substantial extraction. As a practical matter, the pancreas meat may be ground into the extracting vessel and by the time a commercial batch of about 1500 to 2000 pounds of pancreas meat can be ground, the extraction mixture will, in this improved operation, be ready for discharge into the separator. Then the extraction mixture may be run through the separator, recovering the effluent in a holding tank while discharging the residue to a second extraction tank containing a further quantity of extracting solution, and with a pump and circulating system similar to that associated with the first tank. Shortly after the time this separation is completed, the extraction mixture of this second tank may be run through this same separator, recovering the effluent so that it may later be combined with the first extract, and the combined extracts treated to recover insulin therefrom. While the second extraction mixture is being separated, the first extraction vessel may be recharged by grinding fresh pancreas into it, so that by the time the mixture from the second extraction vessel is completed, the new mixture from the first extraction tank may be separated, and so on. This type of operation serves to give a high yield of insulin with a minimum of equipment and in a short period of time. Specific examples of this type of operation are given as follows:

A. 1500 pounds of frozen beef pancreas glands were hashed into a tank containing 450 gallons of 85% ethyl alcohol and 33 liters of phosphoric acid. The resulting mixture was passed through the impeller pump and recirculated through the pump for a period of 30 minutes. The impeller of the pump rotated at 1750 R. P. M. with a peripheral speed of 3400 feet per minute. The temperature of the mixture was 45° F. and the pH was 3.0. The extraction mixture was then passed through a continuous type Bird centrifuge and the suspended meat solids removed.

The removed meat solids were similarly reextracted in a tank containing 450 gallons of 65% alcohol by continuously recirculating the mixture through the impeller pump for a period of 30 minutes. The meat solids were again removed by centrifugation as before. The combined alcoholic extracts after clarification were found upon biological assay to contain 2050 International Units of insulin for each pound of original glands processed.

B. 40 pounds of frozen pork pancreas glands were hashed into a tank containing 47 liters of 82% alcohol and one liter of phosphoric acid. The mixture was recirculated through the same impeller pump rotating, as in the above example, for a period of 15 minutes. The temperature of the extraction mixture was 9° C. and the pH 3.0. The meat solids were then removed by centrifugation, using a basket type centrifuge. The removed meat solids were reextracted in 45 liters of 64% alcohol containing 160 cc. of phosphoric acid, and the mixture recirculated through the impeller pump for a period of 15 minutes. The meat solids were again removed by centrifugation as before. The liquid extracts from the centrifuge were clarified by filtration. Biological assay of the combined extracts showed the insulin content to be equivalent to 1800 International Units per each pound of pancreas glands processed.

C. 40 pounds of frozen pork pancreas glands were hashed into a tank containing 47 liters of 82% alcohol and one liter of phosphoric acid. The mixture was passed through the impeller pump and recirculated through the pump for a period of 15 minutes, the impeller of the pump being rotated at about 1750 R. P. M. with a peripheral speed of 3400 feet per minute. The blades of the pump, on striking the liquid, give rapid pulsations within the liquid, producing a varying pressure on the tissue and a distorting of the tissue as by squeezing and stretching. The temperature of the mixture was 45° F. and the pH was 3.0. The meat solids were then removed by centrifugation, using a basket-type centrifuge. The removed meat solids were reextracted in 45 liters of 64% alcohol containing 160 cc. of phosphoric acid and the mixture was recirculated through the impeller pump operating at the same rate of speed for a period of 15 minutes. The meat solids were again removed by centrifugation as before.

The extracts recovered from the above contained considerable lipoidal material or fat. Part of the filtrate was filtered to recover the fat or lipoidal material, and the remainder of the filtrate was subjected to centrifugation for the recovery of the lipoidal material.

If desired, the separation of the fat or lipoidal material is accomplished after there has been a concentration of the extracts and reduced pressure to remove at least a portion of the organic solvent.

The solvent may be any water-miscible organic solvent for insulin, such as ethyl alcohol, methyl alcohol, propyl alcohol, isopropyl alcohol, acetone, etc., or mixtures thereof. We perfer to use an aliphatic alcohol of less than 4 carbon atoms, and find ethyl alcohol generally the most desirable.

The alcohol or other insulin solvent is usually employed in a mixture containing acid and water, the acid being hydrochloric acid, sulphuric acid, or other suitable acid. We prefer to use phosphoric acid, and the pH of the mixture during the extraction step should, when phosphoric acid is used, preferably be in the range of 2.5 to 6.0, and for best results should be in the range of 3.0 to 5.5. Although acid pH values outside these ranges may be used, the yield of insulin falls off substantially above pH 6.0, and the quantity of acid necessary makes it usually impracticable to go below 2.5.

Our process is operable also when an alkaline reagent is used in place of the acid. Suitable alkaline reagents, such as sodium bicarbonate or ammonium hydroxide, may be used and the pH in such case may be within the range of 7.5 to 9.0.

The concentration of the solvent should be sufficiently high to avoid substantial solubility of other substances, such as the pancreatic enzymes, and should not be so high as to produce substantial insolubilization of insulin. We find that an alcohol concentration of 50% to 85% by volume in the liquid present in the extraction mixture is satisfactory. Concentrations below 50% permit solubility of an undesirable amount of enzymes together with protein impurities, and concentrations above 85% produce a decreased yield of insulin. We prefer 60% to 75% alcohol concentration.

When we refer to "concentration" in this specification and claims, we mean the over-all concentration in the extraction mixture on the basis of the total volume of liquid present and not the concentration of the solvent which is added to the process.

The temperature at which the extraction is conducted may vary through a wide range, but we prefer to conduct the extraction step at temperatures between 0° C. and 15° C., and most suitably at about 10° C.

The insulin-containing extracts recovered from pipe 27 may be further clarified, if desired, by centrifuging or filtration, and then are concentrated at reduced pressure to remove at least a portion of the organic solvent. The lipoidal material, which separates upon concentration, is removed by filtration or centrifugation. Further, concentration brings the material to the aqueous phase, and further unwanted solids may be separated.

The insulin in the filtrate may be precipitated by the addition of sodium chloride, and the salt cake thus obtained may be further purified by solubilizing in water and precipitating the insulin at its isoelectric point. The recovered precipitated insulin may be further solubilized and crystallized after the addition thereto of zinc acetate or zinc chloride, to thereby obtain the zinc insulin salt.

Instead of the conventional purification method just described, it will be understood that other well-known purification methods leading to the preparation of finished amorphous insulin or zinc insulin crystals.

We believe that an important factor which contributes materially to the high yield of insulin obtained by our processes is the feature whereby the pancreas meat particles or masses are subjected to mechanical forces through operation of apparatus such as pump 15, which cause the different particles or masses to be broken or stretched and distorted, so that there is infusion of the solvent into the insulin-containing portions of pancreas material. Where there are self-contained agglomerations or masses, the impeller serves to break these into minute particles in the presence of the solvent, so as to expose new surfaces and open new avenues of access to the solvent. We believe that advantage is obtained also over and above the actual shearing or severance of the particles or masses, since the impeller action serves to stretch and distort the insulin-containing particles and subject them to varying pressures, which functions, we believe, play a large part in getting the insulin from the individual minute portions of the gland and into the solvent.

It is a further advantage that the extraction mixture is drawn from the bottom of the extracting vessel, and after treatment by the impeller is again discharged at the top of the vessel where it meets a clearer portion of solvent and becomes further extracted as it more slowly makes its way again to the bottom of the tank.

We further believe that the functions of the impeller above described are especially important in obtaining high insulin yields because of enzyme action which otherwise takes place. Although it is understood that enzymic action is not likely at the pH of the extraction mixture (pH 3.0 or thereabout), the actual pH of the interior of the insulin-containing pancreas particles or masses is substantially above this figure, and unless and until the solvent permeates every minute portion of such interiors, there is opportunity for enzymes to act to destroy a portion of the insulin. However, such action by enzymes is effectively avoided by utilizing the comminuting or distorting action of the impeller to forcibly bring the extracting solution into this special relation with every minute bit of insulin-bearing material. The enzyme action is avoided in two ways, first, by effectively bringing down the pH within the meat particle or mass to a point where enzyme action is inhibited, and secondly, by bringing about quick physical separation of insulin from its association with the pancreas and holding the insulin in solution before there is time for the enzymes to act.

In the apparatus illustrated, we have shown the impeller pump 15 which, by reason of its construction and operation, serves effectively to perform the functions above referred to. Instead of the specific type of pump shown, we may use, for example, a high-speed grinder, or any type of device which will impel the pancreas material in the presence of the solvent in a manner so as to shear or distort the masses or particles as above described. We prefer, however, to use a device which is effective also for transferring the material treated as the treatment takes place, preferably taking material from the bottom of the extraction vessel and discharging it again to the top of the vessel.

If desired, tanks 12, 29 and 43 may be equipped with rotatable blades for mixing the meat and solvent, but this is not essential and we find it of no particular advantage. Such mixers are not at all effective in the function performed by the impeller pumps 15, 31, and 48, since they serve only to turn and push the material about in the slurry and do not shear or distort the insulin-bearing masses or particles. Further, the action of such mixers is not effective in transferring the material so as to insure that all of it would be subjected to treatment. Except for the action of the impellers employed in our process, the enzymes have an opportunity to attack the insulin within the self-contained particles or masses and particularly in the larger masses or agglomerations, before the solvent reaches all of the insulin. A very substantial period (2 to 3 hours) has been required to produce substantially full contact of the pancreas material with the solvent, and during this time the temperature of the material is at a point where enzymes are active and have opportunity to destroy a certain amount of insulin. When the semi-frozen pancreas glands are ground and fall into the make-up tank or extraction vessel, there is a tendency for the material, no matter how finely ground, to bunch together in masses or agglomerations, and in the prior practice, we believe that the permeation of the solvent into the pancreas material has been slower and less complete than has been supposed.

In the present invention, by treating a small portion of the pancreas material through the action of the impeller pump 15, or other such device which will impart a like treatment, so that the masses therein are effectively comminuted or distorted in the presence of the solvent, there is assurance that the solvent may reach the insulin in each minute portion being treated. Furthermore, by constantly transferring the treated material to an upper portion of the tank and withdrawing material at the bottom, it is made certain that all of the agglomerations in the tank are broken up.

While we have referred at some points to the extraction of insulin from beef and pork pancreas glands, it will be understood that our process is applicable to any pancreas material, including the pancreas of sheep, whales and fish. While also we have referred to the use of the process on pancreas glands, it will be understood that the invention is applicable to other animal tissues for the extraction of important constituents therefrom, such as, for example, lipoidal material.

Since the impeller has two blades, there is an impact by each of the blades during a single rotation of the impeller, so that at a rotational velocity of 450 R. P. M., there are at least twice this number of impacts between the blades and the liquid. Similarly, at the higher rotation of 1750 R. P. M., an increased number of impacts between the blades and the liquid is brought about, producing thus rapid hydraulic pulsations which exert varying pressures upon the tissue, causing a stretching or squeezing of the tissue and bringing the liquid into contact with minute surfaces of the tissue material. We find that the liquid pulsations produced by rapid contact of the blades with the liquid are highly effective in themselves in bringing about the stretching and squeezing actions of the tissue material, producing an infusion of the liquid into all portions of the tissue and producing in the extract the desired insulin and lipoidal material and leaving the tissue solids substantially free of insulin, fats, etc.

The hydraulic pulsations are found to be critical as to rate. The rate must be sufficient to produce a removal of the insulin and of lipoidal material, and the rate should not exceed a point at which the tissues become disintegrated to the extent of forming a fine suspension of particles averaging less than 20 microns in size. Such a micronic type suspension of the material renders clean separation almost impossible, and the rate of rotation should, therefore, be less than the rate at which such a fine suspension-forming disintegration occurs. With a two-bladed impeller in the pump, we find that the R. P. M. should be about 450 or more, and should probably not greatly exceed 1750. If the latter rate should be exceeded, the period of treatment should be reduced to avoid the formation of a fine suspension. In general, it may be stated that the impacts between the impeller blades and the liquid, at the rate of, say, two impacts per rotation of the impeller, such impacts should amount to at least 900 per minute at a peripheral speed of 1500 feet per minute in order to bring about an effective extraction of insulin, lipoidal material, etc., and the number of impacts per minute may be increased to 7200 and higher as long as the treatment is limited in duration and does not bring about the fine suspension of the tissue material.

As indicated, the process herein is applicable to the recovery of lipoidal material or fat from pork and other meat solids, enabling such separation to be brought about at relatively low temperatures, such as, for example, room temperatures and below. The extraction of the fat from the tissues may be accomplished in any suitable liquid body for receiving the fact and for transmitting the hydraulic pulsations found to be effective in the removal of fat. Any pork tissues containing fat, or any animal tissue, including bone material containing fat, may be employed in the apparatus shown or in the process described wherein the material is subjected in liquid to rapid hydraulic pulsations producing a squeezing and stretching action of the tissue without disintegrating the material to the point of forming a fine suspension, whereby it is then possible to quickly remove from the extract through centrifugation, flotation, or filtration, the fat or lipoidal material. In the foregoing process described, the vibrations or pulsations are of such frequency or are continued to such an extent that the tissues are stretched and squeezed alternately under the varying pressures caused by impacting or striking the liquid to bring the extractant liquid into contact with all portions of the tissues, whereby insulin or lipoidal material is caused to remain in the extract and for later recovery therefrom while employing a frequency low enough or for a sufficiently restricted period to prevent disintegration of the tissues into a fine suspension or colloidal mass.

The foregoing detailed description has been given for purposes of illustration only, and it is understood that our improvements may be practiced in greatly different ways using any one of many varied procedures, all within the spirit of the invention.

We claim:

1. In a process of extracting insulin from pancreas glands, the steps of suspending comminuted pancreas glandular tissues in an aqueous organic solvent for insulin to form a slurry, and passing the suspended tissues in said solvent through an impeller pump by means of said pump, said pump comprising a hollow casing providing a central inlet and a peripheral outlet, and a bladed impeller mounted for free rotation within said casing and arranged to propel material from said inlet to said outlet, said tissues being squeezed and stretched sufficiently within said pump to promote the extraction of the insulin therein while at the same time limiting the extent and duration of the said squeezing and stretching to prevent said tissues from being disintegrated into an emulsion, the bladed impeller of said pump being rotated at a speed of at least 450 revolutions per minute but below a speed at which the average diameter of the tissue particles discharged from said pump outlet approaches 20 microns.

2. In a process of extracting insulin from fat-containing pancress glands, the steps of suspending comminuted pancreas glandular tissues in acidified aqueous ethanol to form a slurry, and passing the suspended tissues in said ethanol through an impeller pump by means of said pump, said pump comprising a hollow casing providing a central inlet and a peripheral outlet, and a bladed impeller mounted for free rotation within said casing and arranged to propel material from said inlet to said outlet, said tissues being squeezed and stretched sufficiently within said pump to promote the extraction of the insulin therein, while at the same time limiting the extent and duration of the said squeezing and stretching to prevent and duration of the said squeezing and stretching to prevent said tissues and the fat therein from being disintegrated into an emulsion, the bladed impeller of said pump being rotated at a speed of at least 450 revolutions per minute but below a speed at which the average diameter of the tissue particles discharged from said pump outlet approaches 20 microns.

References Cited in the file of this patent

UNITED STATES PATENTS

| | | |
|---|---|---|
| 863,062 | Griswold | Aug. 13, 1907 |
| 2,115,418 | Dragstedt | Apr. 26, 1938 |
| 2,183,837 | Hamilton | Dec. 19, 1939 |
| 2,282,138 | Kellogg | May 5, 1942 |
| 2,352,154 | Walter | June 20, 1944 |
| 2,357,566 | Walter et al. | Sept. 5, 1944 |
| 2,635,104 | Chayen | Apr. 14, 1953 |

OTHER REFERENCES

Ser. No. 255,849, Suss (A. P. C.), published June 1, 1943.

Chem. and Engineering News, vol. 30, No. 50, Dec. 15, 1952, pp. 5266 and 5268.

Somogyi: Journal Biol. Chem., vol. 60, 1924, pp. 38, 43 to 46.

MacLeod: Carbohydrate Metabolism and Insulin, 1926, p. 73.